(12) United States Patent
Min (10) Patent No.: US 10,705,328 B2
(45) Date of Patent: Jul. 7, 2020

(54) LASER LIGHT SOURCE DEVICE AND PARKING INDICATOR LIGHT SYSTEM INCLUDING SAME

(71) Applicant: SEONGWON TPS INC., Seoul (KR)

(72) Inventor: Sa Hyun Min, Seoul (KR)

(73) Assignee: SEONGWON TPS INC., Seoul (KR)

( * ) Notice: Subject to any disclaimer, the term of this patent is extended or adjusted under 35 U.S.C. 154(b) by 0 days.

(21) Appl. No.: 16/496,359

(22) PCT Filed: Sep. 5, 2017

(86) PCT No.: PCT/KR2017/009688
§ 371 (c)(1),
(2) Date: Sep. 20, 2019

(87) PCT Pub. No.: WO2018/174353
PCT Pub. Date: Sep. 27, 2018

(65) Prior Publication Data
US 2020/0142183 A1    May 7, 2020

(30) Foreign Application Priority Data
Mar. 22, 2017  (KR) .................... 10-2017-0035922

(51) Int. Cl.
*G02B 26/08*  (2006.01)
*F21S 41/16*  (2018.01)
*G08G 1/14*  (2006.01)

(52) U.S. Cl.
CPC .......... *G02B 26/0883* (2013.01); *F21S 41/16* (2018.01); *G08G 1/14* (2013.01)

(58) Field of Classification Search
CPC ........ G02B 26/0883; F21S 41/16; G08G 1/14
(Continued)

(56) References Cited

U.S. PATENT DOCUMENTS 4,288,777 A * 9/1981 Luik ................. B60Q 1/48
200/19.05
5,420,416 A * 5/1995 Iida ..................... G01J 3/18
250/201.1
(Continued)

FOREIGN PATENT DOCUMENTS

JP    10-003599   1/1998
JP    10-3599     1/1998
(Continued)

OTHER PUBLICATIONS

EPO, Supplementary European Search Report of EP 17901416.2 dated Mar. 13, 2020.
SIPO, Office Action of CN 201780088842.9 dated Apr. 10, 2020.

*Primary Examiner* — Ricky D Shafer
(74) *Attorney, Agent, or Firm* — Lex IP Meister, PLLC (57) ABSTRACT

A laser light source device of the present invention is disclosed. More specifically, the present invention relates to a laser light source device for emitting a deflected light so as to form a specific shape by outputting a laser beam through a point light source, and a parking indicator light system including the same. According to an embodiment of the present invention, an indicating line according to a road shape is projected and displayed on a road surface within an underground parking lot such that a driver may easily recognize traveling and parking directions of a vehicle on a road with a limited road width, narrow view, and dim illumination.

9 Claims, 10 Drawing Sheets

(58) Field of Classification Search
USPC .......... 359/211.2, 211.3, 625, 742, 831, 837; 362/259, 331, 339, 521; 340/932.2
See application file for complete search history.

(56) References Cited

U.S. PATENT DOCUMENTS

| | | | | | |
|---|---|---|---|---|---|
| 5,844,720 | A | * | 12/1998 | Ohara | F21V 5/02 359/599 |
| 5,872,657 | A | | 2/1999 | Rando | |
| 5,933,225 | A | * | 8/1999 | Yamabuchi | G01S 7/481 356/5.01 |
| 6,278,538 | B1 | | 8/2001 | Schleipen | |
| 7,380,969 | B2 | * | 6/2008 | Yamashita | G02B 5/045 362/331 |
| 2002/0196639 | A1 | * | 12/2002 | Weidel | F21S 41/143 362/521 |
| 2009/0009744 | A1 | | 1/2009 | Fiolka | |
| 2016/0025299 | A1 | * | 1/2016 | Yamazaki | F21V 5/00 362/336 |
| 2016/0238385 | A1 | * | 8/2016 | Ohtomo | H04N 13/25 |

FOREIGN PATENT DOCUMENTS

| | | |
|---|---|---|
| JP | 2000064233 | 2/2000 |
| JP | 2009-042620 | 2/2009 |
| JP | 2016-091430 | 5/2016 |
| KR | 10-1458048 | 11/2014 |
| KR | 10-2015-0017792 | 2/2015 |

\* cited by examiner

LASER LIGHT SOURCE DEVICE AND PARKING INDICATOR LIGHT SYSTEM INCLUDING SAME

BACKGROUND OF THE INVENTION

1. Field of the Invention

The present invention relates to a laser light source device, and more particularly, to a laser light source device for emitting deflected light so as to form a specific shape by outputting a laser beam through a point light source, and a parking indicator light system including the same.

2. Description of the Related Art

In general, minor accidents between vehicles or a vehicle and a facility such as a wall frequently occur within an underground parking lot having a limited road width, narrow view, and dim illumination. In particular, although a separate lighting is installed within an underground parking lot, a driver may hardly recognize circumstances around a road due to low brightness and narrow view and thereby, there is always a risk of generating accidents.

In order to minimize generation of such accidents and to facilitate safe traveling of vehicles, various types of vehicle guidance system and indicator light system have been suggested.

For example, KR Patent Publication No. 10-2008-0107037 discloses a road traveling direction displaying system using a laser including one or more laser direction indicators installed to direct a traveling direction of a road and a laser beam blocking means installed at the front of the laser direction indicator to block the laser beam irradiated from the laser direction indicator.

Such a road traveling direction displaying system facilitates a driver to recognize a path and a center line of a road by a laser beam and thereby, to safely lead vehicles. However, various numbers of the systems need to be installed densely at regular intervals on each part of a road for one area so that the installation cost is significantly high and it is hard to manage the system.

Since the laser beam is a point light source traveling straight, a projected area is limited. Accordingly, a number of laser direction indicators and related devices are required for drivers to actually recognize the laser beam.

SUMMARY OF THE INVENTION

The present invention provides a parking indicator light system for easily recognizing traveling and parking directions of a vehicle on a road within an underground parking lot having a limited road width, narrow view, and dim illumination.

The present invention also provides a parking indicator light system that may be used in a curved road by projecting not only a straight lined but also curve-lined shape having a curvature on an irradiated surface.

The present invention also provides a parking indicator light system for displaying an indicating line by using a laser beam which is a point light source so as to minimize installation and management costs.

According to an aspect of the present invention, there is provided a laser light source device including: a light source unit for outputting a laser beam of a first light path traveling straight to the front in a point form; an optical unit being disposed on the first light path and comprising a lens having at least one prism pattern formed thereon that deflects the light of the first light path into light of a second light path in a line shape; and a controller for controlling an incident angle of the light of the first light path with respect to the optical unit 120 so as for the line shape to have a curvature.

The optical unit may include the prism pattern formed on at least one surface thereof, and the prism pattern may include a light incident surface and a light output surface having a slope therebetween and may be vertical to the line shape.

The prism pattern may be plural and the plural prism patterns may be arranged in a line.

A length of the line shape may be in proportion to plural numbers of the prism patterns per each unit area of the optical unit.

The curvature may increase in proportion to an angle between a normal and the first light path based on the normal with respect to an incident surface of the optical unit.

The controller may include: a control signal receiver connected with a control device by an I2C method; and an actuator for changing an angle of the incident surface according to a control signal received through the control signal receiver.

The controller may turn on or off the light source unit in response to the control signal included an approach or entry of a vehicle sensed by the sensor.

According to another embodiment of the present invention, there is provided a parking indicator light system including: at least one laser light source device comprising a lens having at least one prism pattern formed thereon which deflects a point form laser beam of a first light path traveling straight to the front into light of a second light path in a line shape; and a control device connected with at least one sensor and electrically connected with the laser light source device so as to control displaying of an indicating line when a vehicle enters or approaches a road surface, wherein the laser light source device controls an incident angle of light of the first light path so as for the indicating line to have a curvature.

The curvature of the indicating line may be set to correspond to a curvature of the road surface in response to an initial set value of the laser light source device.

The control device may include a communication module which receives a control signal regarding displaying of the indicating line and a change of the curvature in response to remote control by an external terminal connected by wire or wireless.

Thee terminal may include a recording medium having an application program recorded thereon to be connected with the control device, and when any one of defined displaying line shapes is selected, the application program may reflect the selected shape into the control signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Before the description, it will be understood that when a part "comprises" or "includes" an element, the part may further include another element rather than excluding another element, unless the contrary description is not specifically mentioned. Also, the term "unit" used in the description denotes a unit that performs at least one function or operation and may be embodied as hardware, software, or a combination of hardware and software.

In addition, the term "embodiment" in the description denotes an example, an instance, or an illustration, however, an object of the present invention is not limited to the embodiment. It will be further understood that the terms "comprises," "includes," and/or "has," when used in claims, are open transition words which do not exclude addition or other elements and are comprehensively used as in a similar manner as in the term "comprising".

Various techniques described in the description may be embodied with hardware or software or, if suitable, may be embodied with a combination of hardware or software. Similarly, the term "unit" used in the description may be regarded as a computer related entity, that is, hardware, a combination of hardware and software, software, or software while in process. In addition, all programs and hardware run in a system including a terminal may be formed as a module unit and may be recorded to one physical memory or dispersedly recorded to at least two memories and recording medium.

Hereinafter, a laser light source device and a parking indicator light system including the same according to an embodiment of the present invention will be described in detail with reference to the accompanying drawings.

Figure 1:
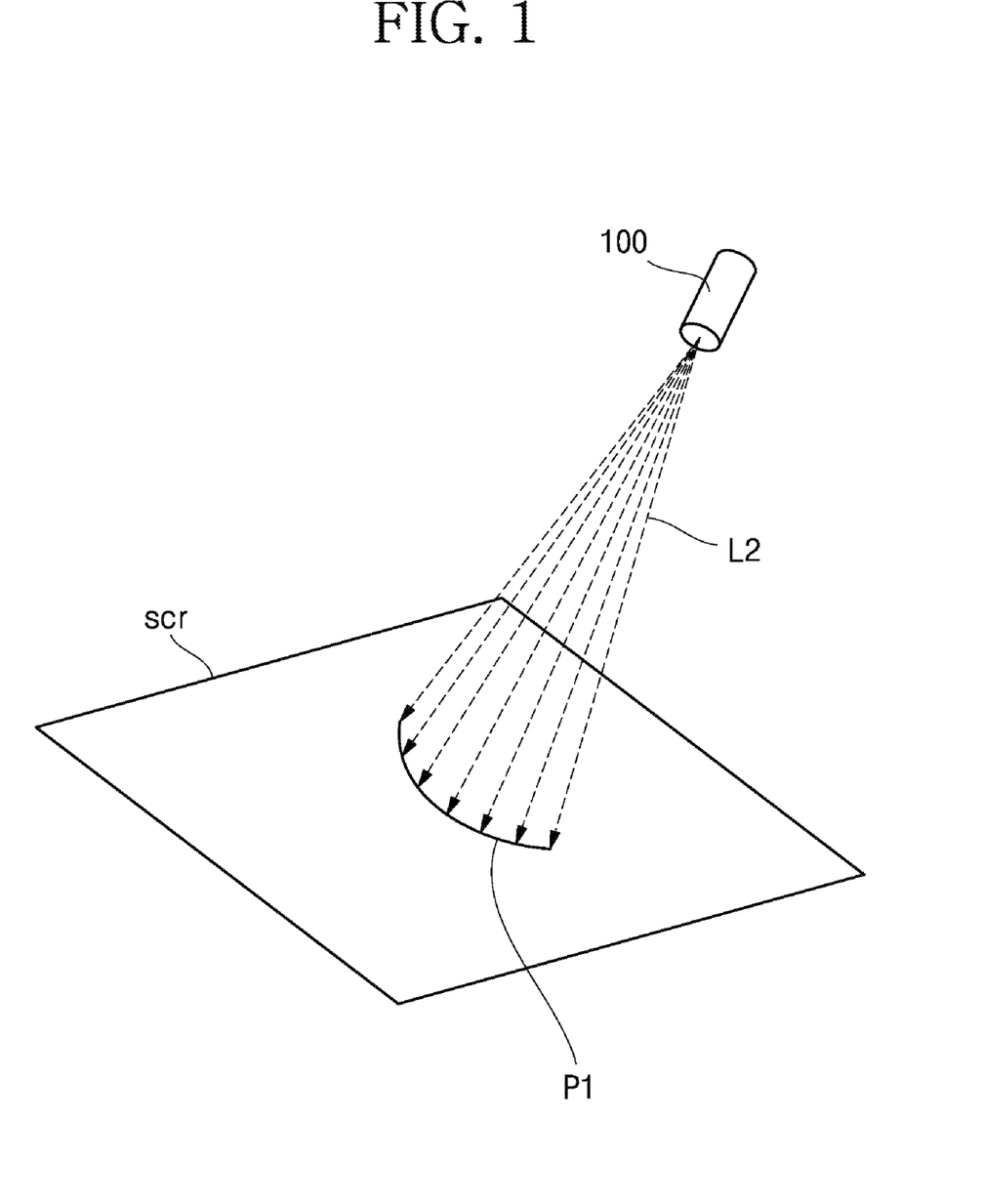
FIG. 1 illustrates a driving method of a laser light source device according to an embodiment of the present invention.
Figure 2:
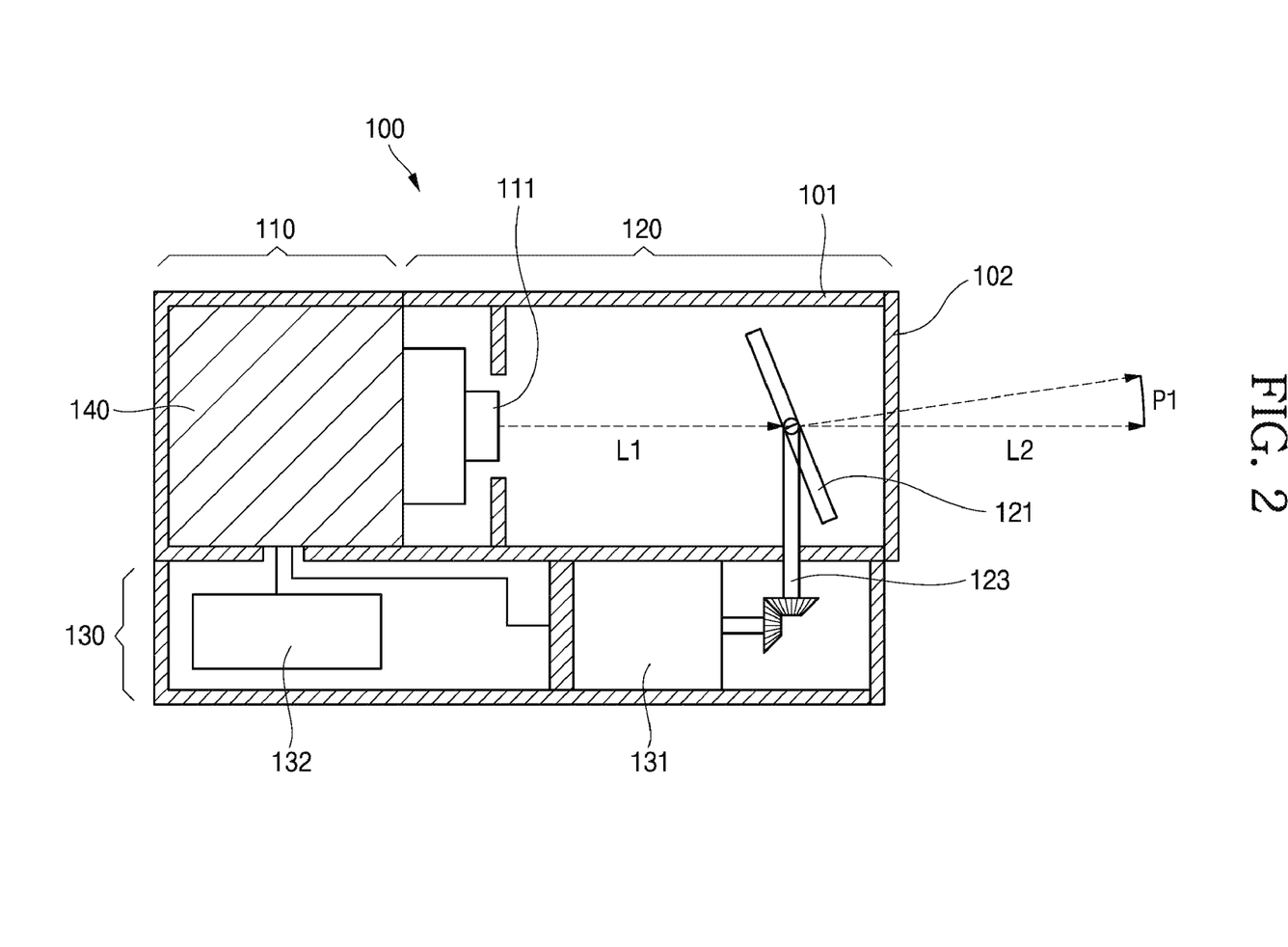
FIG. 2 is a cross-sectional diagram of a laser light source device of FIG. 1.

FIG. 1 illustrates a driving method of a laser light source device 100 according to an embodiment of the present invention and FIG. 2 is a cross-sectional diagram of the laser light source device 100 of FIG. 1.

Referring to FIGS. 1 and 2, the laser light source device 100 according to an embodiment of the present invention deflects light traveling in one direction and displays the deflected light in a line shape on an irradiated surface so that a point light source may be used along with a line light source and a desired curvature may be reflected to the line shape.

The laser light source device 100 includes a plurality of elements in a cylindrical or rectangular case 101 to form one light emitting module and deflects light of a first light path L1 generated from a laser light source 111 to output light of a second light path L2 so that a line shape P1 is projected on an irradiated surface scr.

In particular, the line shape P1 by the laser light source device 100 may be a straight line or a curve having a curvature by an optical unit 120.

More specifically, the laser light source device 100 according to the present invention may include a light source unit 110, the optical unit 120, and a controller 130, wherein the light source unit 110 generates light, the optical unit 120 deflects light, and the controller 130 controls deflection of the optical unit 120.

The light source unit 110 may include the laser light source 111. The laser light source 111 outputs a laser beam, which is a point light source traveling straight, to the optical unit 120 at the front which is spaced apart from the laser light source 111 by a predetermined distance. Such a laser light source 111 may be a light emitting diode (LED) or a laser diode.

A fixed reflecting means (not illustrated) may be included in an inner surface of a space within the case 101 between the light source unit 110 and the optical 120 to increase optical efficiency.

The optical unit 120 may include a prism pattern lens 121 having a predetermined pattern formed thereon and a holder 123 of the prism pattern lens 121. The prism pattern lens 121 of the optical unit 120 is disposed to face an output surface of the light source unit 110 and deflects a light path of a laser beam so as to be projected on an irradiated surface scr. Thus, the line shape P1 may be displayed on the irradiated surface scr.

In particular, the prism pattern lens 121 deflects one-dimensional light output from the light source unit 110 into two-dimensional light on an irradiated surface. Both sides of the prism pattern lens 121 are combined by the holder 123 so as to be rotatable on an axis. Also, one side of the holder 123 may be mechanically connected with an actuator 131 of the controller 130 through a connection with a predetermined cam gear which changes a direction of a rotation axis.

That is, a state of holding the prism pattern lens 121 may be changeable by the controller 130. Accordingly, when an incident angle of a light of the first light path L1 is changed, the second light path L2 is also changed and the straight-line shape P1 may be distorted.

The controller 130 includes the actuator 131 and a control signal receiver 132, wherein the actuator 131 generates a driving force and the control signal receiver 132 controls driving of the actuator 131. The actuator 131 may change a holding angle of the prism pattern lens 121 in response to a control signal received by wire or wireless and accordingly, a predetermined curvature may be formed in the line shape P1.

Here, the curvature changes in proportion to an angle between a normal of the prism pattern lens 121 and the first light path L1 and thereby, the controller 130 changes the line shape P1 to have a desired curvature according to a set value.

In addition, although not illustrated, the controller 130 may further include an operator (not illustrated) which turns on or off the system after receiving an operation input from a user or controls a holding angle of the prism pattern lens 121. The user may personally operate the laser light source device 100 or may set to display the desired line shape P1 through a control signal received by wire or wireless.

The light source unit 110 and the controller 130 may be connected with a power unit 140 which supplies power for driving. The power unit 140 may include a switched mode power supply (SMPS), which receives power from an outside power supplying means and delivers after switching the power, and/or a secondary battery.

As described above, the laser light source device according to an embodiment of the present invention may deflect point form light and display a line shape having a curvature, Hereinafter, structures and functions of elements included in the laser light source device according to an embodiment of the present invention will be described in detail with reference to the accompanying drawings.

Figure 3:
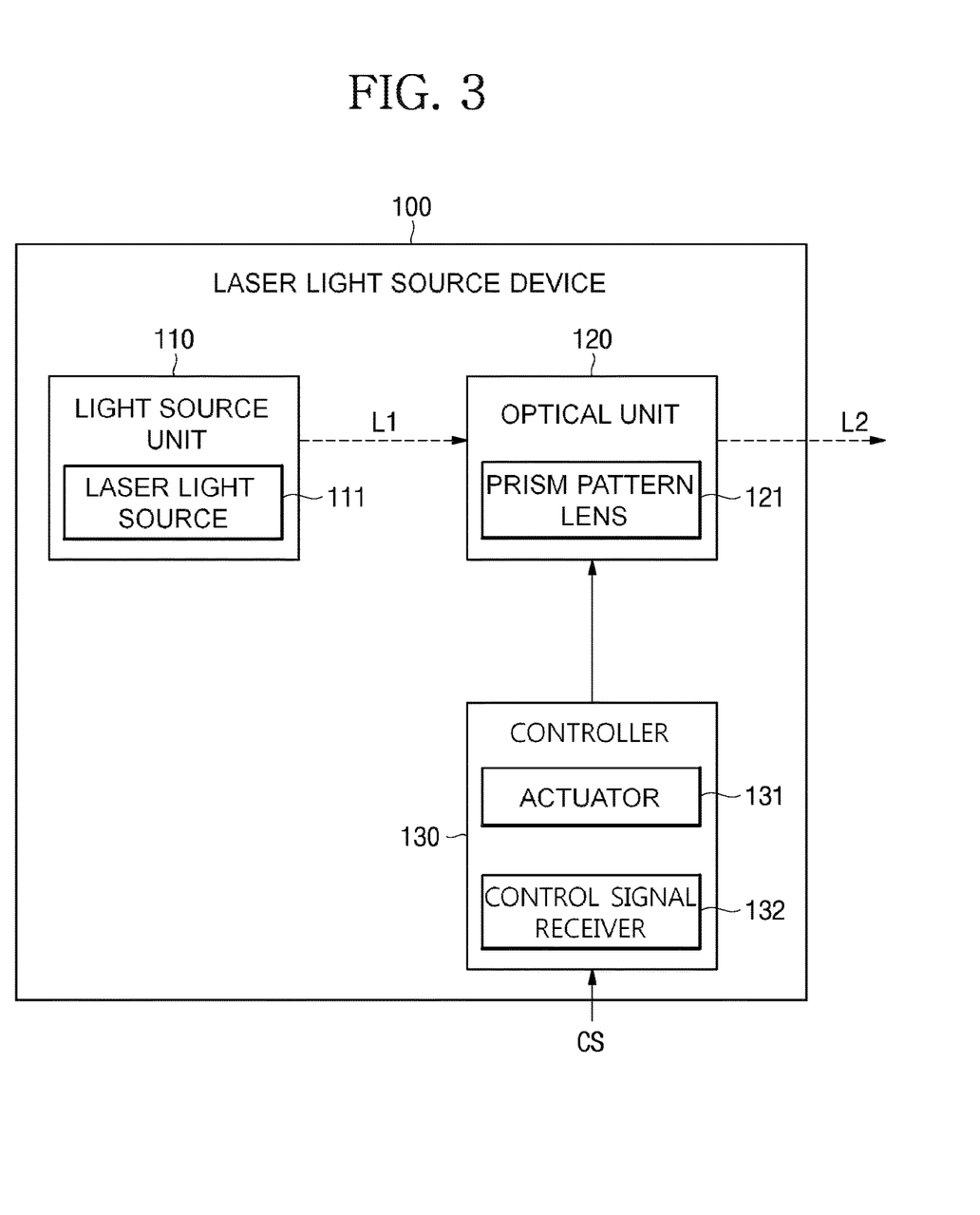
FIG. 3 is a block diagram of a laser light source device according to an embodiment of the present invention.

FIG. 3 is a block diagram of the laser light source device 100 according to an embodiment of the present invention.

Referring to FIG. 3, the laser light source device 100 may include the light source unit 110, the optical unit 120, and the controller 130, wherein the light source unit 110 outputs a laser beam of the first light path L1 traveling straight to the front in a point shape, the optical unit 120 is disposed on the first light path L1 and includes a lens having at least one prism pattern formed thereon that deflects the light of the first light path L1 into the light of the second light path L2 in a line shape, and the controller 130 controls an incident angle of the light of the first light path L1 with respect to the optical unit 120 so as for the line shape to have a curvature.

The light source unit 110 outputs a laser beam traveling straight in the first light path L1. The laser beam is generated by the laser light source 111 and may travel far toward the front due to great intensity and low diffusion. In regard to visibility, the laser beam may be single color light such as red, green or blue.

The light output from the light source unit 110 is incident to the optical unit 120 which is spaced apart from the light source unit 110 by a predetermined distance.

The optical unit 120 includes the prism pattern lens 121 having prism pattern on at least one of an incident surface or an output surface. The prism pattern lens 121 deflects the incident light of the first light path L1 into the light of the second light path L2 and outputs the deflected light.

A detailed description of a form of the prism pattern lens may be described later.

The controller 130 includes the actuator 131 and the control signal receiver 132, wherein the actuator 131 is mechanically connected with the prism pattern lens 121 and the control signal receiver 132 receives a control signal CS by wire and wireless. The controller 130 controls a holding angle of the prism pattern lens 121 so that the actuator 131 has a curvature corresponding to the control signal CS.

That is, the controller 130 controls the optical unit 120 to change the light of the second light path L2.

As described above, the laser light source device according to an embodiment of the present invention deflects point form light into a line shape through the optical unit and the controller controls a holding angle of the optical unit so as to have a line shape curvature.

Hereinafter, a structure of the optical unit included in the laser light source device according to an embodiment of the present invention and a method of forming a line shape using the optical unit will be described with reference to the accompanying drawings.

Figure 4:
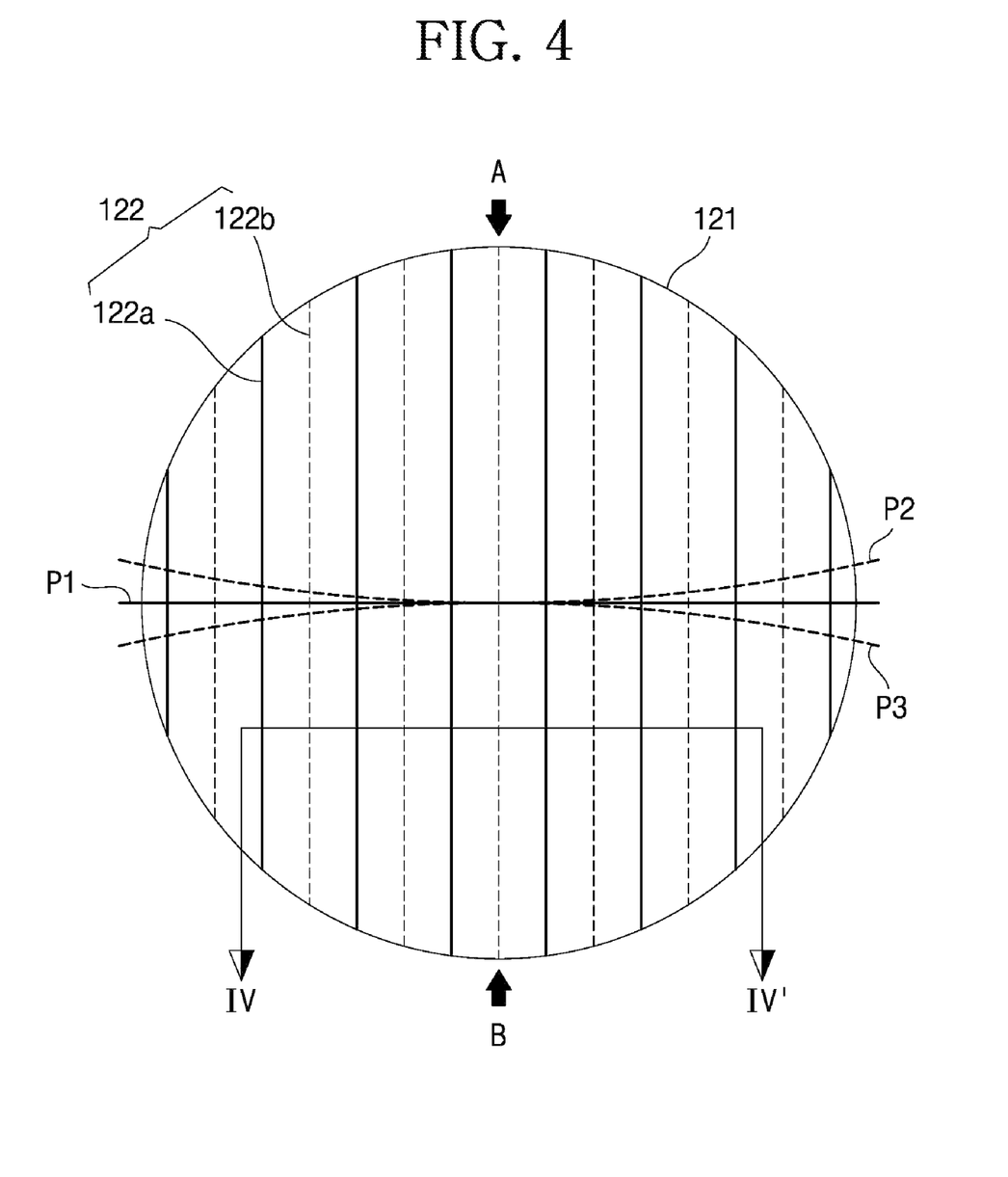
FIG. 4 is a front view of a prism pattern lens included in a laser light source device according to an embodiment of the present invention.
Figure 5:
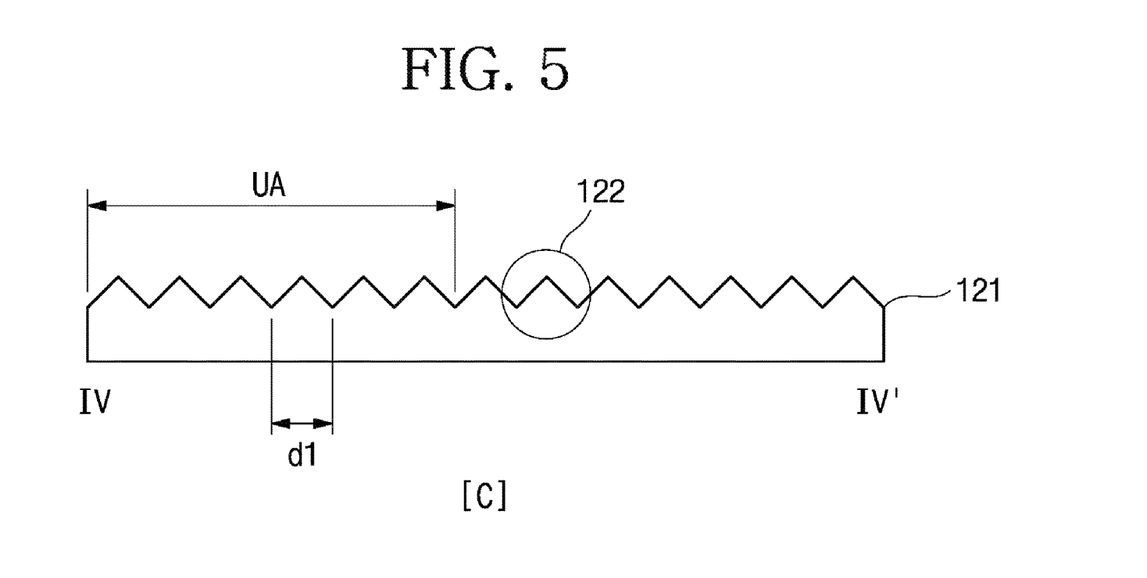
FIGS. 5 and 6 are cross-sectional diagrams of the prism pattern lens cut along a part IV-IV' of FIG. 4.
Figure 6:
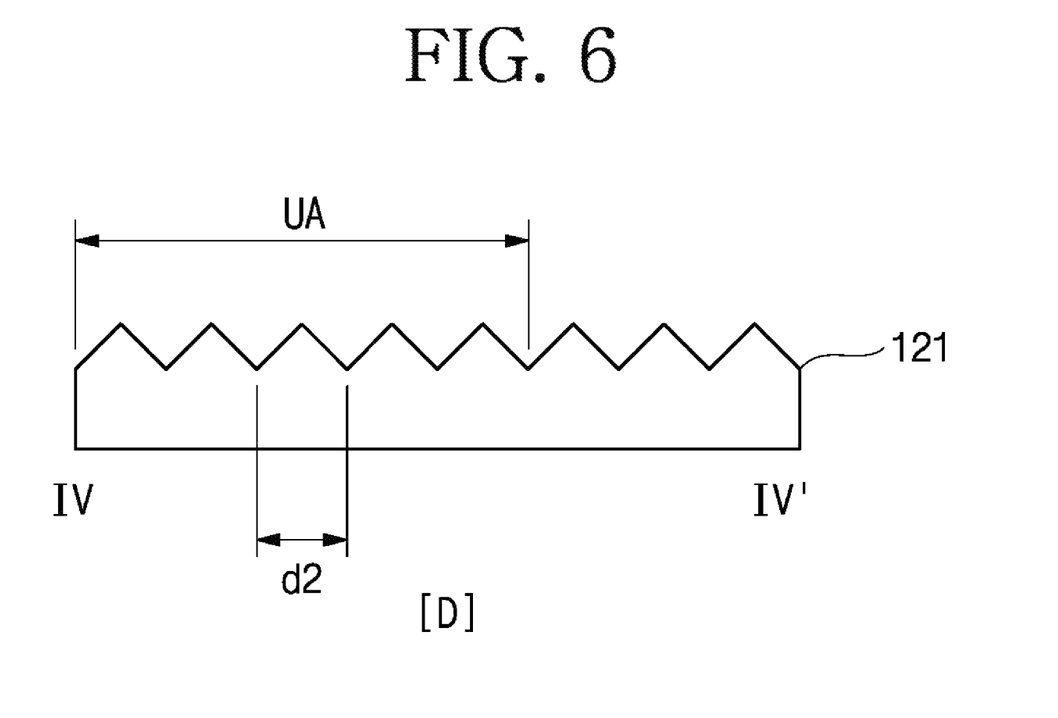
Figure 7:
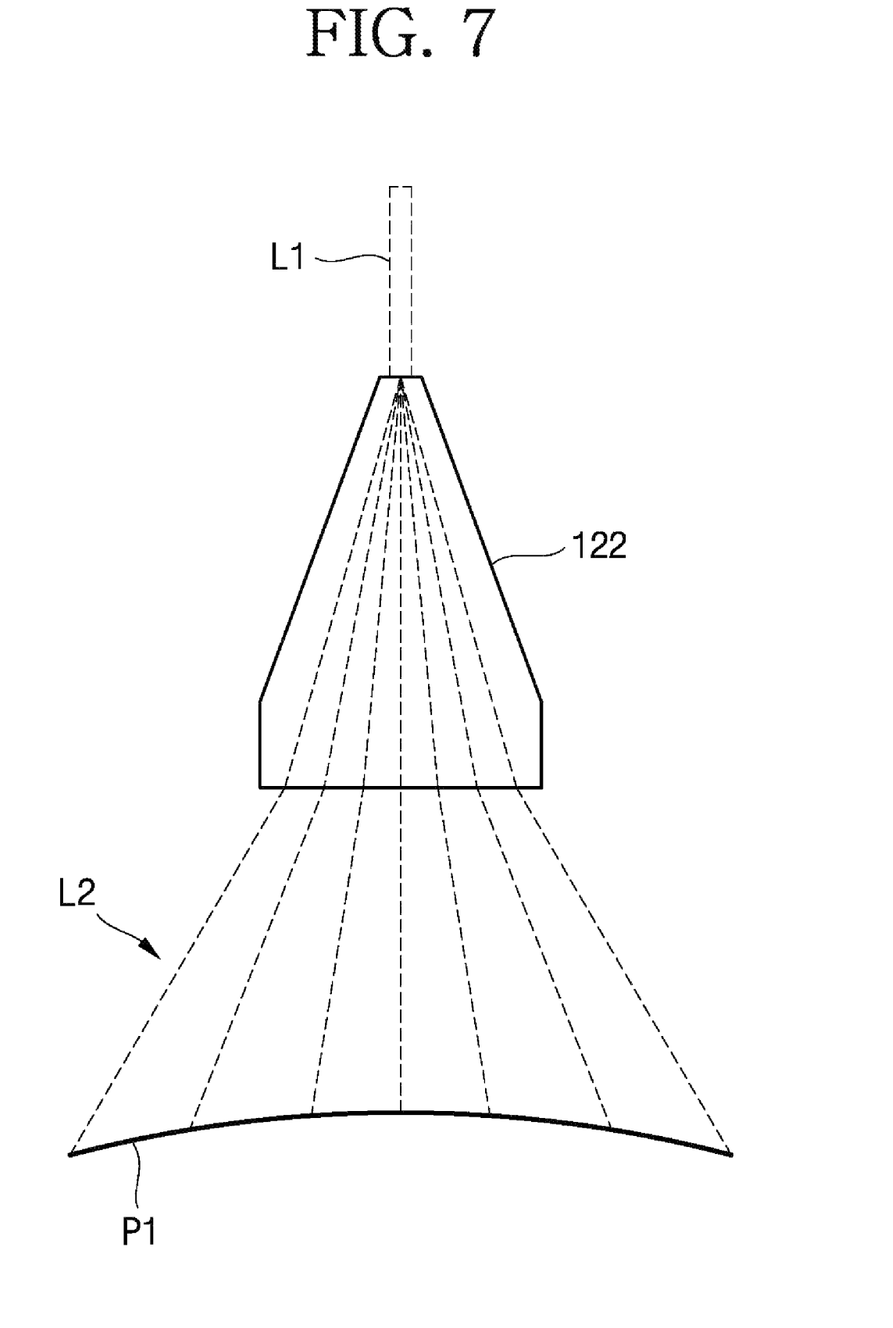
FIG. 7 illustrates one prism pattern and its light path.

FIG. 4 is a front view of the prism pattern lens 121 included in the laser light source device 100 according to an embodiment of the present invention, FIGS. 5 and 6 are cross-sectional diagrams of the prism pattern lens 121 cut along a part IV-IV' of FIG. 4, and FIG. 7 illustrates one prism pattern and its light path.

Referring to FIGS. 4 and 5, the prism pattern lens 121 of the optical unit 120 according to an embodiment of the present invention may be a circle and include at least one prism pattern 122 on any one of a front surface and a rear surface.

In a cross-section of the prism pattern 122, the incident surface and the output surface have a predetermined slope therebetween. The prism pattern 122 may be a prism having a triangle cross-section extended in a longitudinal direction or may be a lenticular having a semicircle cross-section extended in a longitudinal direction. Also, the prism pattern lens 121 may include one prism pattern or a plurality of prism patterns 122 arranged in a line.

More preferably, when the cross-section of the prism pattern 122 is a triangle and a base line is an output surface, first and second lines extended from the output surface touch each other at a peak 122a and an incident surface may be formed.

Here, an angle formed by the first and second lines may affect the line shape P1.

When light is vertically incident on the prism pattern lens 121, a straight-line shape P1 is displayed on an irradiated surface according to the output light. When light is not vertically incident on the prism pattern lens 121, curved-line shapes P2 and P3 are displayed on an irradiated surface in response to a slope of the prism pattern lens 121.

Here, when the prism pattern lens 121 inclines in an A direction, that is, when an A side approaches the irradiated surface, the curved-line shape P2 bent in the A direction is displayed. When the prism pattern lens 121 inclines in a B direction, that is, when a B side approaches the irradiated surface, the curved-line shape P3 bent in the B direction is displayed. Also, as an inclined degree increases, curvatures thereof increase.

In addition, according to an embodiment of the present invention, when a gap between grooves 122b increases in the width of the prism pattern from left to right, that is, one prism pattern, a length of a lines shape projected by the second light path output from the prism pattern decreases (d1<d2). Accordingly, the prism pattern lens 121 in FIG. 5 has a longer line shape than that of the prism pattern lens 121 of FIG. 6.

That is, the length of the line shape may be determined in proportion to plural numbers of the prism patterns per each unit area of the prism pattern lens 121.

Also, the line shape is formed vertically to a longitudinal direction of each prism pattern. As illustrated in FIG. 7, light of the first light path L1 incident onto one prism pattern 122 is refracted on an output surface to be deflected in a left and right direction and a line shape is formed on an irradiated surface, wherein the line shape has a curvature according to an angle to a normal of the irradiated surface with respect to the first light path L1.

Figure 8:
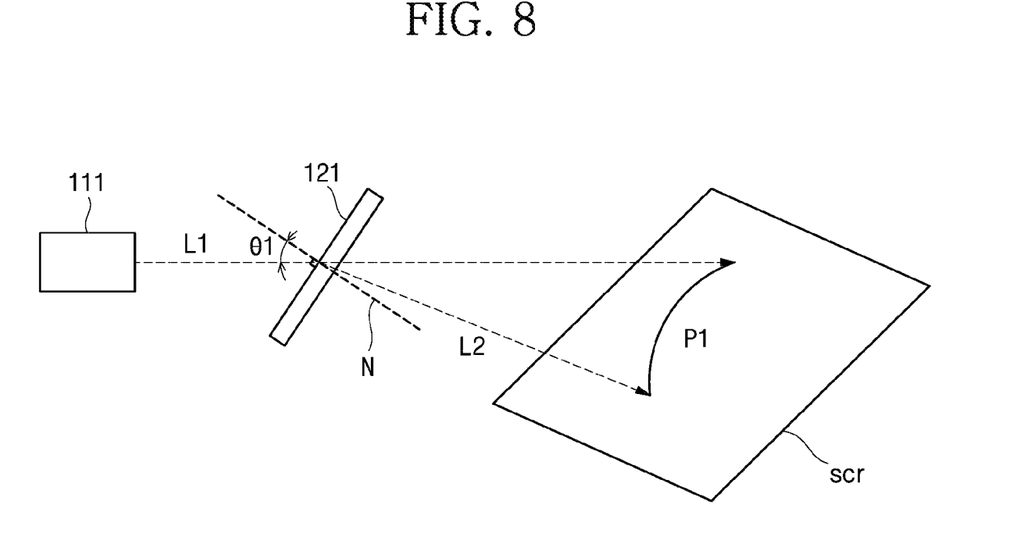
FIGS. 8 and 9 illustrate a method of forming a line shape having a curvature in a laser light source device according to an embodiment of the present invention.
Figure 9:
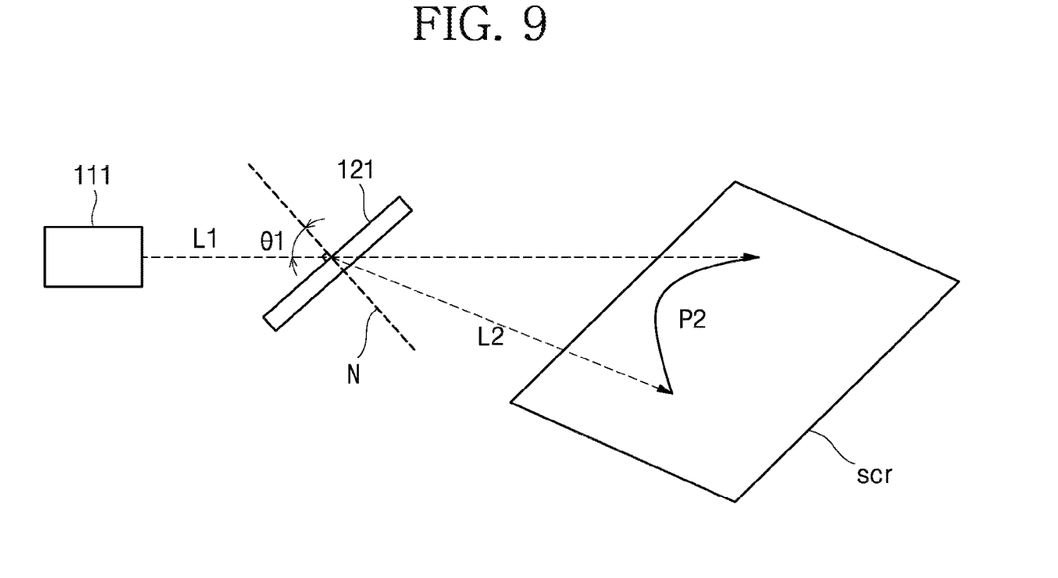

FIGS. 8 and 9 illustrate a method of forming a line shape having a curvature in the laser light source device 100 according to an embodiment of the present invention.

Referring to FIGS. 8 and 9, when the laser light source 111 outputs light traveling straight to the first light path L1, the second light path L2 is determined by an angle between the first light path L1 and an incident surface of the prism pattern lens 121, and a straight line or a curve having a predetermined curvature is projected on the irradiated surface scr.

More specifically, an angle $\theta$ between the first light path L1 and a normal N with respect to the incident surface of the prism pattern lens 121 may be adjusted in the range of 0° to 90° at lower or upper side. When the angle $\theta$ between the first light path L1 and the normal N is 0°, a curvature is not formed and thus, first and second line shapes P1 and P2 becomes straight lines.

Also, when the angle $\theta$ between the first light path L1 and the normal N gradually increases from 0° and approaches 90°, a curvature increases. That is, since a second incident angle $\theta_2$ is larger than a first incident angle $\theta_1$ ($\theta_2 > \theta_1$), a curvature of the second line shape P2 is greater than that of the first line shape P1.

In addition, the upper side or the lower side of the first and second line shapes P1 and P2 approaches the irradiated surface scr and a curvature is formed by bending both sides of the first and second line shapes P1 and P2 in an approaching direction.

As described above, the laser light source device according to an embodiment of the present invention may display not only a straight line but also a curve having a curvature.

Hereinafter, a parking indicator light system using the laser light source device above will be described with reference to the accompanying drawings.

Figure 10:
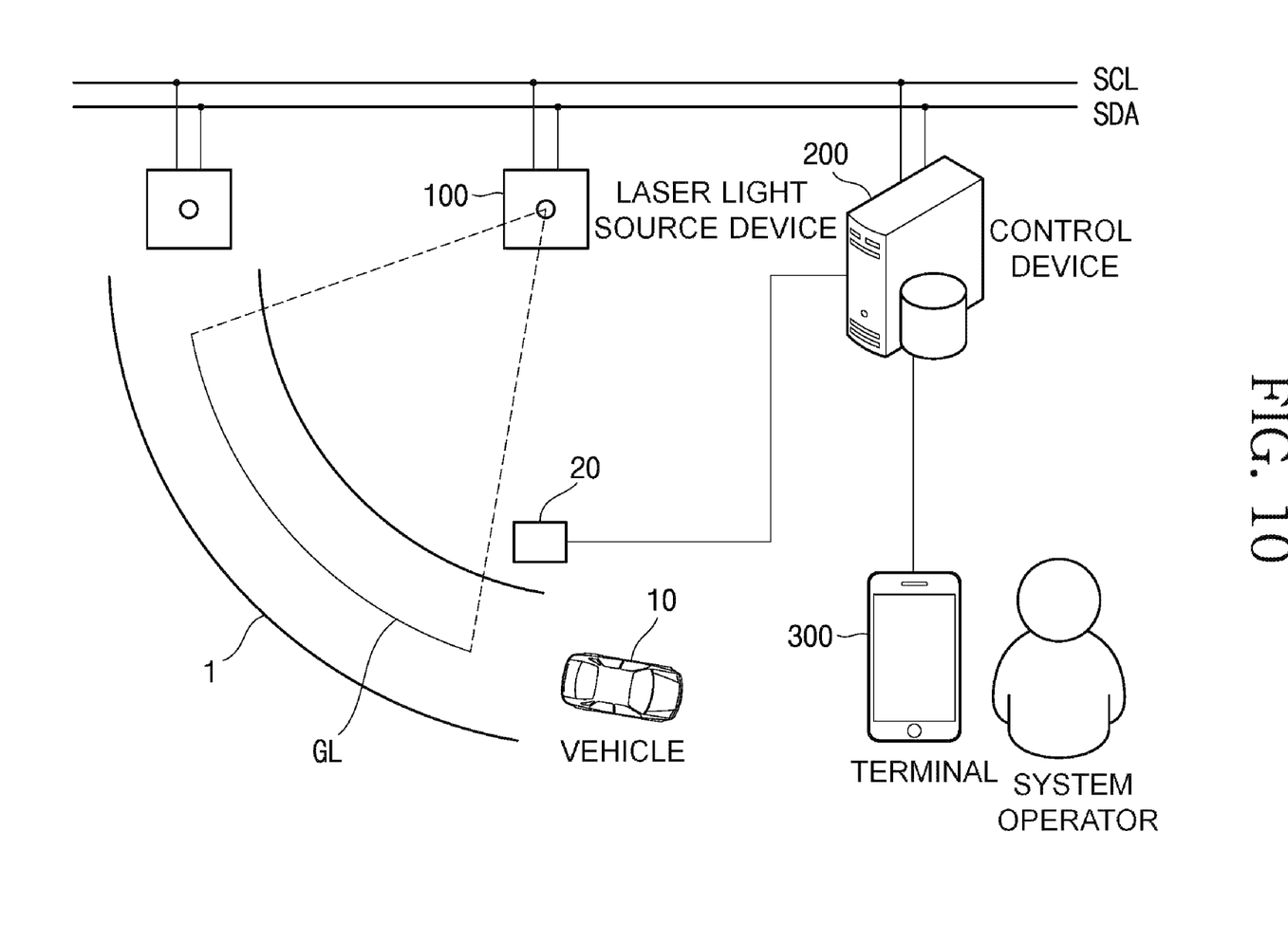
FIG. 10 illustrates a structure of a parking indicator light system including a laser light source device according to an embodiment of the present invention.

FIG. 10 illustrates a structure of a parking indicator light system including a laser light source device according to an embodiment of the present invention.

Referring to FIG. 10, the parking indicator light system including the laser light source device according to an embodiment of the present invention includes at least one laser light source device 100 and a control device 200, wherein the laser light source device 100 includes a lens having at least one prism pattern formed thereon which deflects a point form laser beam of a first light path traveling straight to the front into light of a second light path in a line shape, and the control device 200 is connected with at least one sensor and is electrically connected with the laser light source device 100 so as to control displaying of an indicating line GL when a vehicle 10 enters or approaches a road surface 1. In particular, the laser light source device 100 controls an incident angle of light of the first light path so as for the indicating line GL to have a curvature.

The laser light source device 100 includes the light source unit for outputting a laser beam, the optical unit for deflecting a path of the laser beam to a left and right direction, and a controller for controlling deflection of the optical unit and projecting the line form indicating line GL on the road surface 1.

One laser light source device 100 may be installed to face the road surface 1 in a predetermined range or may be installed to cover all area of the road surface 1, for example, an upper side of a side wall or a ceiling adjacent to the side wall in an underground parking lot.

In particular, a curvature of the indicating line GL may be set when a system operator firstly installs the laser light source device 100 and then, the indicating line GL corresponding to a fixed set value may be displayed while driving.

The control device 200 is connected with the laser light source device 100 by wire or wireless and provides a control signal for turning on or off the indicating line GL and changing a curvature.

The control device 200 may be connected with the laser light source device 100 installed to each road surface 1 by an I2C method so as to transmit a control signal and a system operator may set displaying of the indicating line GL and a curvature on the road surface 1.

In particular, the control device 200 may be connected with at least one sensor 20 installed to be adjacent to the road surface 1 and may control driving of the laser light source device 100 in response to an approach or entry of the vehicle 10 sensed by the sensor 20.

In order to smoothly perform the functions described above without any delay, the control device 200 may be embodied as a computing device including a high-performance microprocessor and a mass storage recording medium.

A terminal 300 may be indirectly connected with the laser light source device 100 through the control device 200 or may be connected with a control signal receiver included in the laser light source device 100 through wireless communication so as to set displaying and a curvature of the indicating line GL.

In this regard, the terminal 300 may include a recording medium having a predetermined application program recorded thereon to receive operational input from a system operator and to generate a control signal, and may be a mobile terminal that is portable.

When any one of a plurality of defined displaying line shapes, that is, a plurality of curvatures, is selected, the application program transmits the selected shape by reflecting it into the control signal.

Accordingly, a system operator directly or indirectly communicates with the laser light source device 100 by using own terminal 300 and thus, may remotely control the laser light source device 100.

As described above, the parking indicator light system including the laser light source device according to an embodiment of the present invention may efficiently minimize accidents caused by vehicles since an indicating line that is easily recognizable by a driver is displayed on a road surface with a limited environment such as an underground parking lot.

Also, although not illustrated, the laser light source device according to an embodiment of the present invention may be applied to not only the parking indicator light system above but also a line laser level used in building or road construction.

For example, horizontal and vertical work may be performed in the building construction along with curved type topographical work, and a curvature may be applied to a line so as to be displayed so that construction standards for the corresponding topographical work may be suggested.

According to an embodiment of the present invention, an indicating line according to a road shape is projected and displayed on a road surface within an underground parking lot such that a driver may easily recognize traveling and parking directions of a vehicle on a road with a limited road width, narrow view, and dim illumination.

Also, according to an embodiment of the present invention, a state of holding the optical unit included in the laser light source device may be adjusted to set a curvature of an indicating line so that the parking indicator light system used in a straight road and a curved road may be provided.

In addition, according to the present invention, the parking indicator light system which may display a straight-line shape or a curved-line shape is provided, wherein the parking indicator light system uses only one laser light source device for a fixed area instead of plural laser light source devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A laser light source device comprising:
   a light source unit for outputting a laser beam of a first light path traveling straight to the front in a point form;
   an optical unit being disposed on the first light path and comprising a lens having a plurality of prism patterns arranged in a line, wherein the lens deflects the light of the first light path into light of a second light path in a line shape; and
   a controller for-varying a curvature of the line shape by changing a slope of the lens, wherein the prism patterns are formed on any one surface of the lens; and wherein the controller turns on or off the light source unit in response to a control signal included an approach or entry of a vehicle sensed by a sensor.

2. The laser light source device of claim 1, wherein the prism patterns comprises a light incident surface and a light output surface having a slope therebetween and are vertical to the line shape.

3. The laser light source device of claim 2, wherein the curvature increases in proportion to an angle between a normal and the first light path based on the normal with respect to an incident surface of the optical unit.

4. The laser light source device of claim 3, wherein the controller comprises: a control signal receiver connected with a control device by an I2C method; and an actuator for changing an angle of the incident surface according to the control signal received through the control signal receiver.

5. The laser light source device of claim 1, wherein a length of the line shape is in proportion to plural numbers of the prism patterns per each unit area of the optical unit.

6. A parking indicator light system comprising:
at least one laser light source device comprising a lens having a plurality of prism patterns arranged in a line, wherein the lens deflects a point form laser beam of a first light path traveling straight to the front into light of a second light path in a line shape; and
a control device connected with at least one sensor and electrically connected with the laser light source device so as to control displaying of an indicating line when a vehicle enters or approaches a road surface, wherein the prism patterns are formed on any one surface of the lens and the laser light source device varies a curvature of the indicating line by changing a slope of the lens.

7. The system of claim 6, wherein the curvature of the indicating line is set to correspond to a curvature of the road surface in response to an initial set value of the laser light source device.

8. The system of claim 7, wherein the control device comprises a communication module which receives a control signal regarding displaying of the indicating line and a change of the curvature in response to remote control by an external terminal connected by wire or wireless.

9. The system of claim 8, wherein the terminal comprises a recording medium having an application program recorded thereon to be connected with the control device, and when any one of defined displaying line shapes is selected, the application program reflects the selected shape into the control signal.

* * * * *